H. B. McCANDLESS.
PIVOT JOINT FOR RODS AND THE LIKE.
APPLICATION FILED DEC. 16, 1921.
1,435,017.
Patented Nov. 7, 1922.
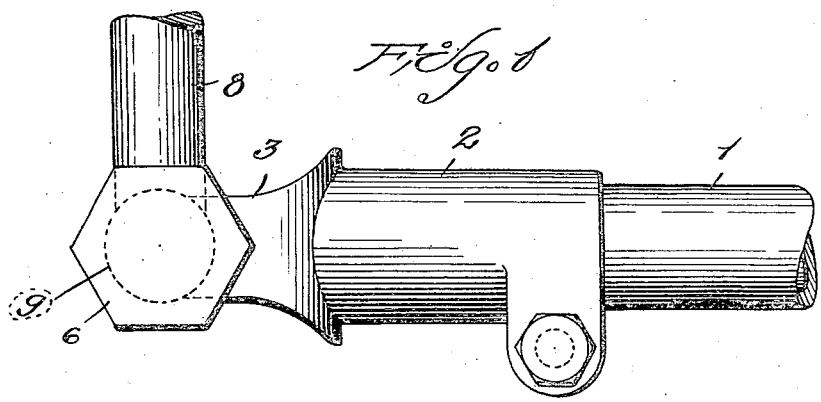
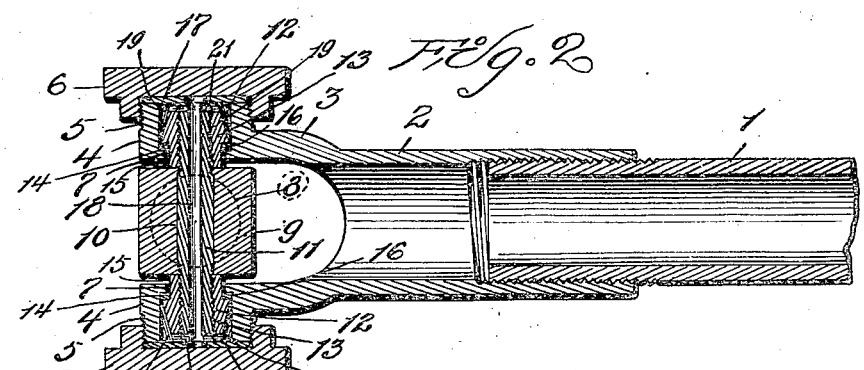
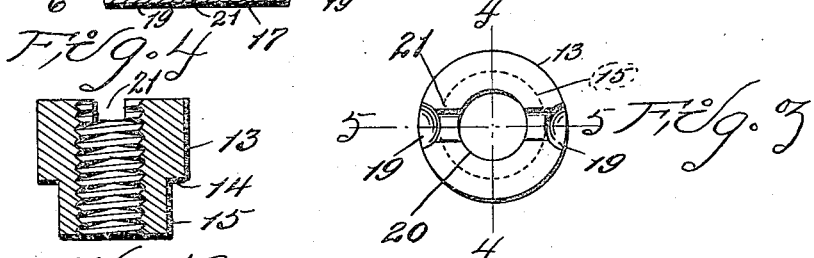
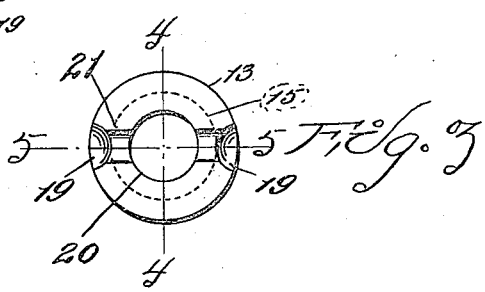
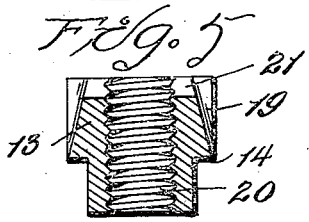
INVENTOR
HARRY B. McCANDLESS,
By Ralph Kalish ATTORNEY Patented Nov. 7, 1922.

1,435,017

UNITED STATES PATENT OFFICE.

HARRY B. McCANDLESS, OF ST. LOUIS, MISSOURI.

PIVOT JOINT FOR RODS AND THE LIKE.

Application filed December 16, 1921. Serial No. 522,849.

*To all whom it may concern:*

Be it known that I, HARRY B. McCANDLESS, a citizen of the United States, residing at the city of St. Louis, State of Missouri, have invented a certain new and useful Improvement in Pivot Joints for Rods and the like, of which the following is a specification, reference being had to the accompanying drawing, forming a part thereof.

This invention relates to a certain new and useful improvement in pivot-joints for rods and the like.

The chief object of my present invention is to provide a joint comprising relatively simple, inexpensively manufactured, and readily assembled parts or elements adapted for co-operation to efficiently connect the rods or other such members together in such manner that the rods or the like, while primarily permitted free and easy hinged or pivotal movement, are fastened together with substantial rigidity, whereby squeaks and rattles are largely obviated and wear minimized.

With the above and other objects in view, my present invention resides in the novel features of form, construction, arrangement, and combination of parts hereinafter described and afterwards pointed out in the claims.

In the accompanying drawing,

Figure 1 is a fragmental plan view of a pair of rods connected or fastened together for pivotal movement by a joint embodying my invention;

Figure 2 is a vertical sectional view of the rod and joint parts shown in Figure 1;

Figure 3 is a plan view of one of the units or bearing-members of the joint; and Figures 4 and 5 are sectional views of such nut or bearing-member taken, respectively, on the lines 4—4 and 5—5, Figure 3.

Referring now more in detail to the said drawing, which illustrates a practical embodiment of my invention and in which like reference characters refer to like parts throughout the several views, I have illustrated, and will here describe, my new pivot rod-joint in connection with an automobile steering gear, for which use the joint is especially adapted and designed; it will be understood, however, that the joint may be equally well used for pivotally connecting rods or other such members in other apparatus or machines.

In the present instance, therefore, 1 indicates the tie-rod of an automobile steering-gear; and threaded or otherwise fixed upon an end of rod 1, is a so-called yoke-member 2 having spaced legs or extensions 3—3.

Forming part of the joint and integrally or otherwise formed upon the outer faces of the legs 3 of yoke-member 2, are outwardly presented oppositely disposed cups or cup-bearings 4—4, the wall of each cup being externally threaded, as at 5, to receive a flanged cap 6. At the base of the cups 4, the yoke-legs 3 are annularly cut-away to provide apertures or openings 7—7 of somewhat reduced diameter relatively to the interior diameter of the cups 4.

8 indicates a steering-arm of the automobile steering-gear, one end 9 of which is disposed intermediate the legs or extensions 3 of yoke 2 and provided transversely with a bore, as at 10.

Forming part of the joint, is a so-called bolt or pin 11 externally threaded at its opposite ends, as at 12—12, to receive cylindrical bearing nuts or so-called bolt-heads 13—13. The bolt or pin 11 is of reduced diameter relatively to the diameter of yoke-apertures 7 and, in use and operation, is disposed through, and tightly fitted at its intermediate or shank portion in, the bore 10 of arm 9, with its opposite ends 12 extending within the yoke-cups 4.

Each nut or bearing-member 13 has a diameter to fit more or less snugly for bearing movement within a cup 4 and at its lower or base end is cut away to provide an annular shoulder, as at 14, and a cylindrical extension, as at 15, the latter having a diameter somewhat less than the diameter of the yoke-aperture 7.

Disposed preferably within and at the base of each cup 4 is a grease-washer or the like 16, and in use and operation, the nuts or bearing-members 13 are threaded upon the bolt-ends 12 to engage at their shoulders 14 upon the washers 16 at the base of the cups 4 and to engage at their extensions 15 upon opposite faces of the interposed arm-end 9. The cups 6, within each of which a suitable thrust washer 17 is preferably disposed, are then threaded upon the cups 4 and function both as closure members for the cups 4 and as so-called grease-retaining members for the nuts 13.

As so disposed and assembled, the cup-apertures 7 having a diameter somewhat greater than the diameter of the nut-extensions 15, and the bolt 11 tightly fitting the arm 8, as described, it will be seen that the pivot-bearing engagement between the two rods or members 1 and 8 is wholly at the nuts 13 and cups 4 which have a more or less extended bearing one upon the other and permit free and easy pivotal or hinged movement of the rods or other such members 1 and 8 relatively to each other. At the same time, as will be seen, the arm or rod 8 being engaged by the nut-extensions 15, lateral shifting of arm 8 relatively to rod 1 is prevented, the connected members being thus fastened together with substantial rigidity and wear taken from such members and thrown approximately entirely upon the co-operating bearing-cups 4 and bearing-members or nuts 13.

For facilitating lubrication of the several parts of the joint, the bolt 11 is formed longitudinally with a bore 18, and each nut 13 is provided longitudinally with diametrically opposite surface channels or ways 19—19 preferably of gradually increasing depth from the inner end shoulder 14 to the outer end of the nut, which ways have communication with each other and with a central nut-bore 20 by means of a transverse end-slot 21, the bore 20 having, in turn, registration with bolt-bore 18. By such construction and with the removal only of upper cap 6, suitable lubricant delivered or placed in upper cup 4 and in the bolt-bore 18 will not only work around upper bearing-member 13, but also down into the lower cup 4 and around the lower bearing-member 13, and the joint as a whole thus most conveniently maintained in well lubricated condition.

I am aware that changes in the form, construction, arrangement and combination of the several parts of the joint may be made and substituted for those herein shown and described without departing from the nature and principle of my invention.

Having thus described my invention, what I claim and desire to secure by Letters Patent is:

1. A pair of spaced elements and a member having an end disposed between said elements, in combination with means for pivotally fastening said elements and member together, said means including a bolt having rigid engagement with the member and nuts having rigid engagement with the bolt and bearing engagement with said elements.

2. A first member having a pair of spaced extensions and a second member having an end disposed between said extensions, in combination with means for pivotally fastening said members together, said means including a bolt having rigid engagement with the second member and nuts having rigid engagement with the bolt and bearing engagement with the extensions of the first member.

3. A pair of separate members, in combination with means for pivotally fastening the same together, said means including a cylindrical cup on one member, a bolt having rigid engagement with the other member and having an end projecting into the cup, and a cylindrical member having rigid engagement with the bolt-end and bearing surface-engagement with the cup.

4. A first member having a pair of spaced extensions and a second member having an end disposed between said extensions, in combination with means for pivotally fastening said members together, said means including outwardly presented oppositely disposed cylindrical cups on said extensions apertured at their base, a bolt having rigid engagement at its shank with the second member, the opposite ends of the bolt projecting into the cups, and cylindrical nuts having rigid engagement with the bolt-ends and bearing engagement with the cups.

5. A first member having a pair of spaced extensions and a second member having an end disposed between and spaced from said extensions, in combination with means for fastening said members together for relative pivoted movement, said means including outwardly presented oppositely disposed cylindrical cups on said extensions apertured at their base, a bolt having rigid engagement at its shank with said rod, the opposite ends of said bolt projecting into said cups, cylindrical nuts having rigid engagement with the bolt-ends and bearing engagement only with the cups, and extensions on the nuts projecting through the cup apertures and having thrust engagement with the second member.

6. A first member having a pair of spaced extensions and a second member having an end disposed between and spaced from said extensions, in combination with means for fastening said members together for relative pivoted movement, said means including outwardly presented oppositely disposed cylindrical cups on said extensions apertured at their base, a bolt having rigid engagement at its shanks with said rod, the opposite ends of said bolt projecting into said cups, cylindrical nuts having rigid engagement with the bolt-ends and bearing engagement only with the cups, extensions on the nuts projecting through the cup apertures and having thrust engagement with the second member, and closure caps fitted upon the cups.

In testimony whereof, I have signed my name to this specification.

H. B. McCANDLESS.